United States Patent [19]

Croft

[11] Patent Number: 5,621,043

[45] Date of Patent: Apr. 15, 1997

[54] ELASTOMERIC SEALANTS

[75] Inventor: Thomas S. Croft, Austin, Tex.

[73] Assignee: Minnesota Mining and Manufacturing Company, St. Paul, Minn.

[21] Appl. No.: 510,471

[22] Filed: Aug. 2, 1995

Related U.S. Application Data

[63] Continuation-in-part of Ser. No. 268,319, Jun. 30, 1994, abandoned.

[51] Int. Cl.$^6$ ..................................... C08G 18/58
[52] U.S. Cl. ..................... 525/111; 528/55; 528/73; 525/403; 525/404; 524/874; 524/875; 524/710; 524/764; 524/772
[58] Field of Search ............... 528/55, 73; 525/111, 525/403, 404; 524/874, 875, 710, 764, 772

[56] References Cited

U.S. PATENT DOCUMENTS

| | | | |
|---|---|---|---|
| 3,158,586 | 11/1964 | Krause | 260/40 |
| 4,476,258 | 10/1984 | Hiles | 523/212 |
| 4,487,913 | 12/1984 | Chung | 528/83 |
| 4,496,707 | 1/1985 | Liggett | 528/61 |
| 4,542,165 | 9/1985 | Kumata et al. | 521/137 |
| 4,544,300 | 10/1985 | Liggett et al. | 523/466 |
| 4,554,299 | 11/1985 | Liggett | 523/466 |
| 4,565,729 | 1/1986 | Liggett et al. | 428/201 |
| 4,668,535 | 5/1987 | Liggett et al. | 427/230 |
| 4,722,946 | 2/1988 | Hostetler | 521/158 |
| 4,789,690 | 12/1988 | Lerik et al. | 521/137 |
| 5,001,167 | 3/1991 | Wiltz, Jr. et al. | 521/174 |
| 5,043,360 | 8/1991 | Pham et al. | 521/159 |
| 5,250,651 | 10/1993 | Price | 528/59 |

FOREIGN PATENT DOCUMENTS

0232124A2  8/1987  European Pat. Off. ........ C08G 18/58

OTHER PUBLICATIONS

U.S. Ser. No. 07/904,841 to Croft, filed Jun. 26, 1992.

*Primary Examiner*—Rachel Gorr
*Attorney, Agent, or Firm*—Gary L. Griswold; Walter N. Kirn; Darla P. Neaveill

[57] ABSTRACT

An elastomer composition, resistant to hydrocarbon fluid and water absorption, comprising a) an isocyanate reactive component comprising a polypropylene ether polyol containing from about 5 percent to about 60 percent of a dispersion comprising a condensation or addition polymer, b) from about 5 percent to about 35 percent of an epoxy resin, and c) a polyurethane formed from said polypropylene ether polyol, having active hydrogen atoms and at least one isocyanate component in the presence of said dispersion and said epoxy resin, said polyurethane having an isocyanate index of less than 100, said elastomer composition exhibiting less than about 20 percent weight gain after being immersed in kerosene for 24 hours at 38° C.

29 Claims, No Drawings

ELASTOMERIC SEALANTS

This is a continuation in part of application Ser. No. 08/268,319, filed Jun. 30, 1994, and now abandoned.

BACKGROUND OF THE INVENTION

1. Field of the Invention

This invention relates to fuel resistant polymeric elastomers and to articles formed therefrom useful as encapsulants, sealants potting compounds, end seals, coatings and dams for electrical and telecommunication devices and as fuel resistant sealants for fuel containers in the transportation industry.

2. Description of the Related Art

Elastomers and sealants containing polyurethanes are well known in the art. It is also known that the polyols, used to produce such polyurethanes, provide elasticity and strongly influence the chemical and fluid resistance of the system.

For example, polypropylene ether polyols are typically used in applications where resistance to hydrolysis and low temperature flexibility is important, however they readily absorb hydrocarbon fluids. Polyester polyols are used when hydrocarbon fuel resistance is important, but they are highly susceptible to hydrolytic attack. Protective ingredients must be added to polyester based polyurethanes to decrease their susceptibility to attack by water if they are to be used in any application which requires even a moderate hydrolytic stability.

Evidence therefore suggests limitations in performance of polyurethane elastomers where fuel resistance combined with low temperature flexibility is sought using only one type of polyol. With the current state of the art, it appears that polyurethane elastomers that inherently exhibit high polarity and fuel resistance also become undesirably inflexible at low temperatures.

For example, certain polyester polyols, in combination with cycloaliphatic polyisocyanates, an amine coupling agent, and a "cement component" containing an epoxy, can be used to prepare hydrocarbon-resistant polyurethanes as disclosed in U.S. Pat. Nos. 4,668,535 and 4,565,729. The isocyanate index was taught to range from 80 to 120, desirably from 90 to 95. It is specifically stated that unsuitable fuel resistance results from the use of too little isocyanate, i.e., an isocyanate index below 80.

U.S. Pat. Nos. 4,487,913 and 4,247,678 disclose the use of methylene bis(4-isocyanato cyclohexane) and mixed polyesters to achieve fuel resistance. Three component mixtures comprising polyester isocyanate prepolymers, amine or ketimine curing agents, and a "cement component" are used to line fuel tanks in U.S. Pat. Nos. 4,554,300; 4,554,299 and 4,496,707. An epoxy compound was included in the "cement" component. Again, it is taught that compositions having an isocyanate index below 80 exhibit unsuitable fuel resistance and/or hydrolysis resistance.

Fuel resistant translucent pasty sealants are obtained in U.S. Pat. No. 3,158,586 from polyester and polyether isocyanate prepolymers, aromatic amine crosslinkers, and liquid diglycidyl ethers. The active hydrogen materials are described as being present in about equal amounts to the available isocyanate groups thereby requiring an isocyanate index of about 100.

U.S. Pat. No. 5,001,167 discloses a polyurethane polymer based on a polyether polyol containing at least 50 weight percent oxyethylene units which is suitable for hydrocarbon environments. However, it is taught that the polymer is preferably used in environments with little water exposure. Water causes swelling of the polymer due to the high oxyethylene content in the polyol segment. It is further taught that polymer dispersions in polyols should be avoided due to the undesirable hardness of elastomers including such dispersions.

Polyurethane foams and elastomers are derived from linear and branched polyols and polyisocyanates at an isocyanate index of from about 65 to about 85 as taught in U.S. Pat. No. 4,722,946. It is specifically stated that isocyanate indices below 65 do not give a product with useful consistency. It is also taught in this reference that elastomers disclosed in U.S. Pat. No. 4,476,258 having an isocyanate index below 65 could not be duplicated, but attempts instead provided liquid materials, which are not useful for the purpose intended. U.S. Pat. No. 4,476,258 had discussed elastomers from urethane forming components in less than stoichiometric amounts.

It would be extremely desirable to prepare elastomers exhibiting resistance to hydrocarbons from relatively inexpensive polypropylene ether based polyols. The use of propylene ether polyols, in polyurethane formation, would yield elastomers combining resistance to hydrolysis with good low-temperature flexibility. This contrasts with polyurethanes based on highly polar, fuel resistant polyester polyols.

It has now been discovered that fuel resistant, flexible, elastomer compositions result when polyurethane formation, between polypropylene ether polyols and multifunctional isocyanates, occurs in a fluid medium that also contains an excess of polypropylene ether polyol, a dispersed polymer comprising a condensation or addition polymer and free epoxy resin. With the three components of polypropylene ether polyol, dispersed polymer and epoxy resin, present with the polyurethane, there is a surprising improvement in the fuel resistance of the resulting elastomer composition. Although the basis for improvement is not fully resolved, there appears to be a synergy amongst the components of the elastomer compositions of the invention such that omission or significant reduction of any one component severely impairs effectiveness for fuel resistance. Compositions thus impaired show weight gains of 30% to 50% or more after immersion of the elastomer in a hydrocarbon fluid such as kerosene. Elastomer compositions of the invention otherwise show minimal weight gain when soaked in kerosene. Typically, there is less than 10% weight gain for these compositions. This advantage is maintained over a significant range of viscoelastic characteristics. For example, elastomer compositions comprising polypropylene ether polyol, dispersed polymer, epoxy resin and polyurethane were prepared with properties ranging from firm elastomers to jelly-like sealants.

Sealants of the present invention are particularly useful for automotive, electrical and telecommunications cable splice closures and related applications. They provide a protective, fuel and water resistant barrier, e.g. for sealing splice cases or closures for wires or wire pairs or fiber optic fibers or other outside telecommunication apparatus from damage caused by environmental exposure. Historically, such applications employed sealants based on butyl rubber that do not perform well in the hydrocarbon contaminated environments.

SUMMARY OF THE INVENTION

The invention provides kerosene resistant elastomer compositions comprising polypropylene ether polyol based polyurethane components formed by reacting the polyol with isocyanates in amounts corresponding to isocyanate equivalent indices of up to about 100, preferably up to about 80. The isocyanate indices may be extremely low e.g., even to 10 or below.

Specifically the invention is an elastomer composition, resistant to hydrocarbon fluid and water absorption, comprising, a) an isocyanate reactive component comprising a polypropylene ether polyol containing from about 5 percent to about 60 percent of a dispersion comprising a condensation or addition polymer, b) from about 5 percent to about 35 percent of an epoxy resin, and c) a polyurethane formed from said polypropylene ether polyol, having active hydrogen atoms and at least one isocyanate component in the presence of said dispersion and said epoxy resin, said polyurethane having an isocyanate index of less than 100, said elastomer composition exhibiting less than about 20 percent weight gain after being immersed in kerosene for 24 hours at 38° C.

Preferred elastomers of the invention comprise:

a) an isocyanate reactive component comprising a polypropylene ether polyol containing from about 5 percent to about 60 percent of a dispersion containing from about 15 percent to about 35 percent of at least one material selected from epoxides and polyureas, b) from about 5 to about 35 percent of an epoxy resin, and c) a polyurethane formed from said polypropylene ether polyol, having active hydrogen groups, and at least one isocyanate component in the presence of said dispersion and said epoxy resin, said elastomer having an isocyanate indices of less than 100, said elastomer composition exhibiting less than about 15 percent weight gain after being immersed in kerosene for 24 hours at 38° C.

Highly preferred elastomers of the invention comprise:

a) from about 1 to about 50 percent of a polyisocyanate component, b) at least about 20 percent of at least one isocyanate reactive component comprising at least one polypropylene ether polyol containing 15 to about 40 percent of a dispersion containing a material selected from an epoxide and a polyurea, c) and from about 5 to about 35 percent of at least one epoxy resin, said elastomer having an isocyanate index of up to about 100, said elastomer composition exhibiting less than a 10 percent weight gain after being immersed in kerosene for 24 hours at 38° C.

The resulting materials have excellent kerosene resistance, with the preferred materials exhibiting less than about twenty percent weight gain, most preferably less than about ten percent, when a Die C (ASTM D412) tensile dumbbell is immersed in kerosene for 24 hours at 28° C. (100° F.). Highly preferred materials exhibit less than five percent weight gain when a Die C (ASTM D412) tensile dumbbell is immersed in kerosene for 24 hours at 38° C. (100° F.).

Excellent hydrolytic stability was also observed with the preferred materials exhibiting less than a five percent weight gain after seven days in boiling water, 100° C. (212° F.) for 2.5 by 5 by 1.3 cm specimens.

Elastomeric materials based on the invention generally have excellent low temperature flexibility with a glass transition temperature ($T_g$) typically below about −46° C. (−50° F.).

The incorporation of a polyester polyol or polycarbonate polyol with polypropylene ether polyol can further improve the kerosene resistance. Suitable polyols have molecular weights of about 100 to about 100,000, preferably from about 400 to about 20,000, most preferably from about 800 to about 20,000. Polyamines having primary or secondary amine groups may be combined with polypropylene ether polyols.

In another embodiment, an elastomer of the invention comprises hollow microspheres as a filler, preferably from about 10 to about 60 volume percent.

The invention also provides encapsulants, potting compounds, sealants, endseals, coatings, vibration damping devices and the like comprising elastomers of the invention.

As used herein, these terms have the following meanings.

1. The term "elastomer" refers to a rubbery material which, when deformed, will return to approximately the original dimensions in a relatively short time.

2. The term "isocyanate index" and "NCO-index" as used herein refer to the ratio of NCO groups over reactive hydrogen atoms present in an elastomer composition given as a percentage:

$$\text{NCO-Index} = \frac{(\text{NCO})}{(\text{active hydrogen})} \times 100$$

In other words, the NCO-index expresses the percentage of isocyanate actually used in a formulation with respect to the amount of isocyanate theoretically required for reacting with the amount of isocyanate reactive hydrogen used in a formulation.

The expression "active hydrogen atoms" as used here for the purpose of calculating the isocyanate index refers to the total of hydroxyl and amine hydrogen atoms present in the reactive compositions in the form of polyols and polyamines. This means that for the purpose of calculating the isocyanate index one hydroxyl group is considered to comprise one active hydrogen and one primary amine group is considered to comprise two active hydrogens. The Zerewitnoff test used to determine active hydrogen is described in *Journal of the American Chemical Society*, Volume 49, page 3181 (1927).

3. The term "isocyanate reactive component" means a compound or blend of compounds containing active hydrogen atoms, having a dispersion contained therein.

4. The terms "equivalent weight" and "molecular weight" as used throughout the present specification refer to equivalent weight values that may be calculated by measuring the content of functional groups per weight of sample, and the molecular weight values that may be calculated from the aforementioned equivalent weight and the theoretical functionality of the compound (i.e., by the total number of hydrogen atoms attached to an oxygen atom and/or a nitrogen atom).

5. The term "polyol" means a substance containing at least two hydroxyl groups attached to a single molecule.

6. The term "polyamine" means a substance containing at least two primary or secondary amino groups attached to a single molecule.

7. The term "essentially inert" as used herein means that the plasticizer does not become cross-linked into the elastomer composition.

8. The term "non-exuding" as used herein means that the plasticizer has the ability to become and remain blended with the elastomer composition. Many excellent plasticizers experience some blooming, or a slight separation from the solid, especially at higher temperatures, and over lengthy storage times. These plasticizers are still considered to be "substantially non-exuding."

9. The term "polymer polyol" or "polymer polyol composition" as employed throughout the specification and appended claims, means a liquid or low-melting polyol, polyol containing blend containing a dispersion polymer comprising a condensation or addition polymer.

10. The term "total unsaturation level" refers to the total unsaturation levels as determined by procedure ASTM D 2849-69 or equivalent procedure.

11. The term "predominantly polypropylene ether polyol" means a polymer of propylene oxide or mixtures of propylene oxide and ethylene oxide, in which the oxypropylene units derived from the propylene oxide constitute at least about 50%.

12. The term "$T_g$" means glass transition temperature.

13. The term "vibration-damping material" means a material which undergoes shear deformation in the presence of vibration forces and dissipates some of its inelastic deformation energy as heat.

14. The term "tan delta" is a damping term which is a measure of a ratio of the energy dissipated as heat (loss modulus G") to maximum energy stored elastically (Storage modulus G') during one cycle of oscillation. (Tan delta=G"/G').

15. The term "epoxy resin" means a liquid epoxy polymer containing more than one α-epoxy group.

16. The term "epoxide" means a group which reacts with a curative therefore to form a crosslinked epoxide dispersion.

Percents, ratios and parts described herein are by weight unless otherwise specifically stated.

DETAILED DESCRIPTION OF THE INVENTION

Polyurethanes

Useful elastomer compositions of the invention comprise at least one polyurethane component. Suitable polyurethanes form via reaction of polyols or polyamines with any isocyanate having the required functionality.

The isocyanate is present in sufficient amount to provide an isocyanate index of below about 100, more preferably below about 80.

The term isocyanate also includes isocyanate-terminated prepolymers. Polyisocyanates may be linear or branched, aliphatic, cycloaliphatic, araliphatic, heterocyclic or aromatic, or any combination of such polyisocyanates.

Particularly suitable polyisocyanates correspond to the formula

wherein n is an integer of from about 2 to about 4, and Q is selected from aliphatic hydrocarbon radicals containing from about 2 to about 100 carbon atoms. Q may include cycloaliphatic hydrocarbon radicals, aromatic hydrocarbon radicals or heterocyclic aromatic radicals and araliphatic hydrocarbon radicals. Portions of Q may contain heteroatoms including oxygen, nitrogen, sulfur and halogens.

Examples of polyisocyanates include ethylene diisocyanate, 1,4-tetramethylene diisocyanate, 1,6-hexamethylene diisocyanate, trimethylhexamethylene diisocyanate, 1,12-dodecane diisocyanate, cyclobutane-1,3-diisocyanate, cyclohexane-1,3 and 1,4-diisocyanate and mixtures thereof, 1-isocyanato-3,3,5-trimethyl-5-isocyanatomethyl cyclohexane (German Auslegeschrift No. 1,202,785, U.S. Pat. No. 3,401,190), 2,4- and 2,6-hexahydrotolylene diisocyanate and mixtures thereof, hexahydro-1,3 and/or -1,4-phenylene diisocyanate, hexahydro-2,4'- and/or 4,4'-diphenylmethane diisocyanate, 1,3-and 1,4-phenylene diisocyanate, 2,4- and 2,6-tolylene diisocyanate and mixtures thereof, diphenylmethane-2,4'- and/or 4,4'-diisocyanate, naphthylene-1,5-diisocyanate, $C_{36}$ dimer acid diisocyanate (DDI) and the reaction products of four equivalents of the aforementioned isocyanate-containing compounds with compounds containing two isocyanate-reactive groups.

Preferred polyisocyanates include hexamethylene diisocyanate, the isocyanurate and the biuret thereof; 1-isocyanato-3,3,5-trimethyl-5-isocyanatomethyl cyclohexane (isophorone diisocyanate); the tolylene diisocyanates and isocyanurates thereof; the mixed isocyanurate of tolylene diisocyanate and hexamethylene diisocyanate; the reaction product of 1 mol of trimethylol propane and 3 mols of tolylene diisocyanate, diphenyl methane diisocyanate, dimer acid diisocyanate (DDI) and 4,4'-methylene-bis (cyclohexyl diisocyanate).

Certain blocked isocyanates are also useful in compositions of the invention. Blocking of polyisocyanates with phenols, acetoacetic ester, diethyl malonate, butanone oxime, epsilon caprolactam and the like is a well-known procedure for the temporary retardation of reactions between polyisocyanates and active hydrogen containing compounds. Depending on the structure of the blocked polyisocyanates, the polyisocyanate can be regenerated at a temperature above about 100° C. for further reaction to form the polyurethane found in elastomer compositions of the present invention. Illustrative of these materials are 4-nonylphenol blocked isocyanate prepolymers available as Desmocap® from Miles.

Epoxy Resins

Elastomer compositions of the invention also comprise from about 1 to about 35 percent, preferably from about 5 to abut 30 percent, by weight of an epoxy resin.

The epoxy resin contains one or more epoxide groups per molecule. It may be a monoepoxide, diepoxide or polyepoxide. It may be saturated or unsaturated, aliphatic, cycloaliphatic, aromatic or heterocyclic and may be substituted with other substituents such as hydroxyl groups, ether radicals, halogen atoms and the like. The epoxide groups may be terminal or inner 1,2-epoxide groups and may be linked to an oxygen atom, i.e., glycidyl ether or glycidyl ester groups.

Compositions of the invention preferably have an epoxide equivalent weight from about 90 to about 950, preferably from about 170 to about 450 and most preferably from about 170 to abut 220. The average epoxy equivalent weight is figured by dividing the average molecular weight of the resin by the number of epoxy groups per molecule.

Epoxy resins having low epoxide equivalents, in the range of about 90 to about 250, are typically preferred because of their lower viscosity, although higher equivalent weight compounds, including those up to about 950, with melting points up to about 75° C., offer advantages where viscosity is not a factor. Liquid epoxy resins, of from 170 to about 220, are most preferred.

Suitable epoxy resins include glycidyl ethers of bisphenol A derivatives, or phenolics such as a phenolformaldehyde resin including Novolak resins. Preferred types of these resins are bis-phenol A type epoxy resins having average epoxy equivalent weights of from about 170 to about 220, and brominated bisphenol A type epoxy resins which have average epoxy equivalent weights of from about 300 to about 800.

Suitable examples include polyglycidyl ethers of polyhydric phenols, for example, bis(4-hydroxyphenyl)methane, 2,2-bis(4-hydroxyphenyl)propane, bis(4-hydroxylphenyl)sulfone, tris(4-hydroxylphenyl)methane and 2,2-bis(4-hydroxy-phenyl)-1,1,1,3,3,3-hexafluoropropane and the like. Commercially available epoxy resins, from bis-phenol A, include Epon™ 826 from Shell Chemical Company. A typical Novolak resin is "D.E.N. 431" from the Dow Chemical Company.

Numerous additional suitable polyepoxide materials are commercially available or readily prepared using well known techniques. Examples include hydantoin epoxy resins; and glycidyl ethers of polypropylene ether glycols, such as "D.E.R. 736" available from Dow Chemical Company.

Isocyanate Reactive Component

The elastomer compositions of this invention contain at least one polyurethane species by reaction of an isocyanate reactive component with a suitable isocyanate compound. Isocyanate reactive components contain at least one polypropylene ether polyol having therein a dispersed polymer phase comprising a condensation or addition polymer. Suitable polypropylene ether polyols contain from about 5 to about 60 percent, preferably about 15 to about 40 percent, of a polymer dispersion. The total isocyanate reactive component, of polyol and polymer dispersion, is present at greater than 20 percent, preferably greater than 30 percent by weight of the total elastomer composition.

Useful predominantly polypropylene ether polyols, are polymers of propylene oxide or mixtures of propylene oxide and ethylene oxide, in which the oxypropylene units derived from the propylene oxide constitute at least about 50%, more preferably at least about 65%, most preferably at least about 75% by weight of the polyether. In addition, the polypropylene oxide polyols should have a total unsaturation content of less than about 0.08, preferably less than about 0.06, more preferably less than about 0.04 and most preferably less than 0.02 milliequivalents per gram polyol.

Suitable polypropylene ether polyols are polyhydroxyl compounds which contain condensation or addition polymers in a finely dispersed or dissolved form, e.g., a dispersion polymer polyol, a grafted copolymer polyol, a solution polymer polyol, or blends thereof. Polyhydroxyl compounds such as these are obtained, e.g., by carrying out polyaddition reactions and polycondensation reactions in situ in polyols.

Thus, polyisocyanates may be reacted with themselves (trimerized) to form polyisocyanurate dispersions as disclosed in U.S. Pat. Nos. 4,386,167 and 4,359,541; with hydrazine to form polyhydrazo-dicarbonamide dispersions as taught in U.S. Pat. Nos. 4,042,537; 4,093,569 and 5,068,280; with alkanolamines to form polyurethane urea dispersions as disclosed in U.S. Pat. Nos. 4,293,470, 4,296,213, 4,374,209 and 4,452,923; with primary hydroxyl short chain polyols to form polyurethane dispersions as taught in U.S. Pat. Nos. 4,438,252 and 4,497,913; or with aminoplast or phenoplast as disclosed in U.S. Pat. No. 4,260,530, and reaction of an oxalate ester and a diamine to form polyoxanate polymer polyol dispersions as taught in U.S. Pat. No. 4,407,983.

Polyhydroxyl compounds can also be modified by vinyl polymers of the type obtained, for example, by polymerizing styrene and acrylonitrile in the presence of polyethers (U.S. Pat. Nos. 3,304,273; 3,383,351; 3,652,639; and 5,093,412). Plastics having particularly good flameproof properties are obtained by using polyether polyols modified (German Offenlegungsschrift Nos. 2,644,922 and 2,646,141 and U.S. Pat. No. 4,028,434) by graft polymerization with vinyl phosphonic acid esters and, optionally (meth)acrylonitrile, (meth)acrylamide or hydroxyl functional (meth)acrylic acid esters. Polyhydroxyl compounds into which carboxyl groups have been introduced by radical graft polymerization with unsaturated carboxylic acids and other olefinically unsaturated monomers (U.S. Pat. Nos. 4,250,077 and 4,207,227) may be used in combination with mineral fillers.

Also suitable are melamine, urea or urea/melamine blend particles dispersed in a polyol (U.S. Pat. Nos. 5,087,384;, 5,106,883 and 5,153,233). Regardless of the specific polyol used, it is generally preferred to use polyols containing primary hydroxy groups. Mixtures of polymer dispersions and conventional polyols may be employed.

Commercially available examples of predominantly polypropylene ether polyols include Multranol™ 9151 and 9238, available from Miles Chemical Corporation; Arcol™ 34-28, available from Arco Corporation, and Pluracol™ 994, available from BASF Aktiengeschelleschaft.

Other suitable polyols have functionalities of from 2 to 8, preferably from 2 to 4. Preferably used are polyester polyols, including ricinoleic acid derivatives, such as castor oil, polyoxyalkylene polyether polyols, and most preferably largely polypropylene ether polyols.

Dispersions of the isocyanate reactive component result from reactions occurring when an epoxide and a curative for the epoxide are in the presence of a suitable polyol. United States patent U.S. Pat. No. 4,305,861 discloses examples of dispersions prepared in polyols that contain epoxides and curatives such as amines, hydrazine, hydrazides or ammonia. Typically, the epoxide and curative are dissolved in the polyols and reaction to form the dispersed polymer particles carried out over a period between 30 minutes and 10 days, preferably between 6 hours and 72 hours, at a temperature of about 0° C. to 150° C. with 50° C. to 70° C. working well. During this process, the initially clear solution changes into a milky dispersion containing from 5 to 60 percent by weight, preferably 5 to 40 percent by weight, most preferably 15 to 30 percent dispersion polymer particles, based on the total weight of the isocyanate reactive component. Reaction times are a function of the temperature and are dependent upon the chemical structure of the epoxides and curatives. Epoxides may be diglycidyl ethers based on bisphenol-A and similar compounds having up to six epoxide functional groups. Preferably the epoxides dissolve in the polyols prior to polymer dispersion formation. Preferred curatives, having from two to six nitrogen containing substituents, include primary amines, amides, hydrazine and hydrazides. Especially preferred are difuntional primary amines derived from aliphatic, cycloaliphatic and aromatic compounds having average molecular weights in the range 60 to 400. A mole ratio of epoxide to curative from 0.4:1 to 5:1 was shown to be effective in the invention. However, proportions of 1:1 to 5:1 insure consumption of the curative to prevent its interference in the subsequent polyurethane forming reaction.

At least one predominantly polypropylene ether polymer must be present in the isocyanate-reactive component; however, polyamines may also be present.

Suitable polyamines are those known in the art which contain more than one primary or secondary amino group capable of reacting with isocyanate groups and have molecular weights from about 400 to about 100,000, preferably about 800 to about 20,000, with functionality from 2 to 6, preferably 2 to 3.

Examples include polyoxyalkylene polyamines derived from the amination of polyether polyols with the majority of the hydroxyl groups replaced by amine groups; polyamidoamines derived from dimerized fatty acids; amine terminated polybutadienes; amine terminated polytetrahydrofuran; amine terminated polybutadieneacrylonitrile copolymers; amine terminated polyethers obtained by hydrolysis of isocyanate prepolymers or by hydrogenation of cyanoethylated polyoxpropylene ethers, polyamines containing urea or amide or urethane moieties in their backbone; cyanoethylated amine terminated polyoxypropylene ethers; polysiloxanes containing amino groups; tetramethylene oxide-di-aminobenzoates; polyethers containing aromatic amine end groups; Lewis acid-blocked primary or secondary aliphatic or aromatic amine groups, aldimines or ketimines of aliphatic polyamines and mixtures of these.

Elastomers of the invention may also contain a plasticizing system having one or more extenders or plasticizers. Useful plasticizers include mono-, di-, and poly-esters, such as trimellitates, phthalates, benzoates, polymeric polyesters, castor oil derivatives, and mixtures thereof. Flame retardency of the elastomers is improved by the use of halogen or phosphorus containing compounds, for example, halogenated phosphate or polyphosphate esters, halogenated organic phosphonates, and halogenated hydrocarbons. These flame retardants, employed along with hydroxyalkyl phosphonate esters and/or appropriate fillers, impart the desired degree of fire retardancy. Illustrative of the above materials is Plasthall® P643 form C. P. Hall company and glyceryl tri(acetyl ricinoleate) available under the Flexricin® trade name from CasChem.

Any conventional catalyst used in the preparation of polyurethanes may be employed herein. Typically, from about 0.005% to about 5.0%, preferably 0.05 to 2.5% by weight of the total reactants of catalyst is added to facilitate the reaction.

Useful catalysts include stannous octoate, bismuth neodecanoate, lead naphthenate, phenylmercuric benzoate, lead ethylhexanoate, and ferric acetyl acetonate.

Exemplary organometallic catalysts include catalytically active compounds of tin, iron, mercury, bismuth, zinc, manganese, lead, copper, cobalt, titanium, antimony, cadmium, aluminum, nickel, cerium, vanadium, and the like. Illustrative of the above compounds would be stannous octoate, bismuth neodecanoate, lead naphthenate, phenylmercuric benzoate, lead ethylhexanoate, and ferric acetyl acetonate. Suitable organic tin compounds include tin (II) salts of carboxylic acids such as tin ethylhexanoate and tin laurate and the tin (IV) compounds, such as dibutyl tin dilaurate, dibutyl tin oxide, dimethyl-tin (IV)-bis-thiolauryl, dibutyl tin-bis-thioglycolic acid octyl ester, and the like. An illustrative example is BiCat 8, available from Shephard Chemical.

One embodiment of the invention contains hollow glass or polymeric or ceramic microballoons. They are typically roughly spherical, ranging in particle size from about 0.5 to about 300 microns. The glass microspheres may be, e.g., Scotchlite™, available from Minnesota Mining and Manufacturing Company (3M). Polymeric microspheres include, e.g., Expancel™ 551DE, available from Nobel Industries, UCAR microballoons, available from Union Carbide Corp., and Dualite™ M6001AE, available from Pierce and Stevens Corp. Zeelan Industries manufactures ceramic microspheres, e.g., Zeeosphere™ X-40. Such microspheres may also be treated with a coupling or wetting agent such as a silane, e.g., 3-glycidoxypropyl trimethoxy silane, or an organochromium or titanium or zirconium complex to enable the elastomer compositions to effectively wet the microspheres. Elastomer compositions containing certain polymer microspheres expand when heated because the microspheres swell when heated. This property is useful for completely sealing voids of complex shape or difficult to access.

Fillers or combinations of fillers may also be present. The term "filler" is used herein to include all solid additives including particulate matter or fibrous matter and the like, present in the composition. Such fillers include glass fibers, graphite fibers, organic polymer fibers, carbon black, mica, aluminum oxide hydrates, various silicates or carbonates or clays, fumed silicas such as Cab-O-Sil™ from Cabot.

It is also possible to add other additives, such as wetting agents, UV absorbers, mold release agents, drying agents, such as molecular sieves, fungicides, oxidation preventatives or any other additive as necessary. As oxidation preventatives, there can be used hindered phenols, for example, Irganox™ 1010, Tetrakis methylene(3,5-di-tert-butyl-4-hydroxyhydrocinnamate)-methane, and Irganox™ 1076, Octadecyl-8-(3,5-tert-butyl-4-hydroxyphenol)propionate, all available from Ciba-Geigy Company.

Although the polymers of this invention show excellent hydrolytic stability without stabilizers, it may be useful at times to include a carbodiimide, such as Staboxol from Miles Chemical Company.

A general method for producing the elastomers themselves requires, first, the preparation of the isocyanate reactive component then adding to it the epoxy resin, additives, fillers and catalyst. Upon addition of isocyanate the formation of polyurethane occurs and is accompanied by viscosity increase as the final elastomer forms. Elastomer compositions are modified depending upon intended use.

Examples of end-use include sealants, linings, coatings, end-seals, gaskets, bushings, sleeves, sound attenuation materials, vibration dampening materials, encapsulants, potting materials and the like.

The term "linings" includes liners for hoses, pipes and containers, and the like. Encapsulants or potting materials include fillers for electrical or signal transmission devices such as splice closures, service branch-out assemblies, cables, and the like. Sealants are also useful for containing fuel, as part of a fuel tank.

The following examples are only for illustration and are not limiting to the scope of the invention. All parts, percents and ratios are by weight unless otherwise indicated. A dashed line indicates that no test was run for that particular example.

Test Methods
Shore OO Hardness
Shore OO hardness was tested according to the American Society of Test Methods, Test Method "D2240".
Tensile Strength and Elongation
Tensile Strength and elongation were measured according to ASTM Test Method "D-412".
Kerosene Resistance The kerosene resistance was measured by the swelling when placed in a hydrocarbon. The exemplary hydrocarbon is kerosene. To demonstrate kerosene resistance; 3 tensile dumbbells (cut by die C according to ASTM D412) were immersed for 24 hours (1 day) at 37.8° C. (100° F.). This procedure was chosen to expose the maximum surface area to the kerosene. After 24 hours, the samples were rinsed in water and wiped dry. Swelling after soaking was measured by weighing the sample before and after soaking to the nearest milligram and in expressed as the percent change in weight by the following equation:

$$\text{Percent weight change} = (w_1-w)/w \times 100$$

where w is the weight of the specimen before the immersion and $w_1$ is that after the immersion. Practice of this invention preferably produces an elastomer exhibiting a percent weight gain of less than about 30 percent, more preferably less than about 20 percent, and most preferably less than about 10 percent.

This test requires the use of fresh kerosene for each test in order to achieve accurate results. When run accurately, the data show variation of about 5% or less.

Hydrolytic Stability

In order to evaluate the resistance to water, three specimens 2.5 by 5 by 1.3 cm thick were weighed to the nearest milligram and then boiled in water, thus 100° C. (212° F.), at constant volume (reflux) for 1 week (7 days±2 hours). The samples were allowed to cool in the water for 2 hours, removed, blotted dry and maintained at 24°±2° C. (75°±2° F.) for 2 hours prior to weighing to the nearest milligram. The swelling after soaking is expressed as the percent weight change between before and after the immersion by the following equation:

percent weight change=$(w_1-w)/w \times 100$ where w is the weight of the specimen before the immersion and $w_1$ is that after the immersion. The samples preferably maintained the original shape and did not disintegrate and had a percent weight gain of less than 15 percent, preferably less than 10 percent and most preferably of less than 5 percent.

One-Quarter Cone Hardness

Hardness was tested using ASTM Test Method "D1403".

Heat Aging

Dry heat aging was tested by heating a thin polymer slab for 18 hours on a Teflon™ coated plate to 104.4° C. (220° F.) in a vented oven. Syneresis or its absence was observed visually, and dumbbells were then cut for elongation testing.

Glossary

The following glossary lists the commercially available components used in the following examples. The function of each component is also listed. Function of the component is defined as follows:

| Function | Abbreviation |
|---|---|
| Isocyanate | I |
| Blocked isocyanate | BI |
| Polyamine | PA |
| Alcohol | AL |
| Plasticizer | P |
| Polymer Polyol | PP |
| Microsphere filler | M |
| Microsphere filler, expanding | MEF |
| Filler | F |
| Catalyst | C |
| Antioxidant | A |
| Epoxy resin | E |

| MATERIAL | DESCRIPTION | AVERAGE EQUIVALENT WEIGHT | SOURCE | FUNCTION |
|---|---|---|---|---|
| Vestanat IPDI | isophorone-diisocyanate (3-Isocyanato methyl -3, 5, 5, - trimethylcyclohexyl - Isocyanate) | 111 | Huls | I |
| Mondur CD | Carbodiimide derivative of 4, 4' - diphenylmethane diisocyanate | 144 | Miles | I |
| Desmodur W | 4,4' methylene-bis(cyclohexyl) Isocyanate, hydrogenated MDI or $H_{12}MDI$ | 132 | Miles | I |
| Cyanamid TMXDI (meta) | Meta-tetramethylxylene diisocyanate - | 122 | Cyanamid | I |
| Desmocap 11A | 100% solids 4-nonylphenol blocked isocyanate prepolymer with 2.6 average functionality with 2.4% available isocyanate | 1750 | Miles | BI |
| Multranol 9151 | Polyurea dispersion in ethylene oxide capped polypropylene oxide triol with terminal unsaturation (meg/gm) of 0.06 | 2003 | Miles | PP |
| Multranol 9238 | Polyurea dispersion in ethylene oxide capped polypropylene oxide triol - Polymer polyol | 2003 | Miles | PP |
| Arcol Polymer Polyol 34-28 | Dispersion of 11% polyacrylonitrile/10% polystyrene in ethylene oxide capped polypropylene oxide triol | 2003 | Arco | PP |
| Pluracol 994LV | Dispersion of 40% polyacrylonitrile/polystyrene in polypropoxylated glycerin triol-polymer polyol | 1935 | BASF | PP |
| Poly-G-85-28 | Ethylene oxide capped polypropylene oxide of about 6000 molecular weight | 2003 | Olin | AL |
| Poly-L(R)-385-29 | Ethylene oxide capped polypropylene oxide of about 5800 molecular weight with terminal unsaturation (meg/g) of 0.017 | 1935 | Olin | AL |
| Capa 316 | Polycaprolactone tetrol of about 1000 molecular weight | 257 | Interox | AL |
| Arcol LHT 28 | Polypropylene oxide triol | 2003 | Arco | AL |
| USP Castor Oil | Vegetable oil of about 70% glycerin triricinolein and about 30% glycerol diricinolein mono-oleate or monolinoleate and hydroxy functionality of about 2.7 | 344 | United Catalyst | AL |
| Urethhall 4050-35 | Polyester polyol of about 3000 molecular weight with average functionality of about 2 | 1484 | C. P. Hall | AL |
| Urethhall 4150-55 | Polyester polyol of about 2000 molecular weight with average functionality of about 2.8 | 1020 | C. P. Hall | AL |
| Permapol KM 10-1733 | Aliphatic polycarbonate diol | 431 | ICI-Stahl | AL |
| Jeffamine T403 | Polypropylene oxide triamine of about 400 molecular weight | 81 | Texaco | PA |
| MXDA | Meta-xylene diamine of about 136 molecular weight | 68 | Aldrich | PA |
| Plasthall P643 | Adipate polyester of about 2000 molecular weight | NA | C. P. Hall | P |
| PDMS Diamine | Polydimethylsiloxan, diamine. Average molecular weight of | 5000 | 3M | PA |

| | about 20,000 | | | |
|---|---|---|---|---|
| Jeffamine T5000 | Polypropylene oxide triamine 5000 molecular weight | 833 | Texaco | PA |
| Hycar 13000 x 21 | Difunctional secondary amine terminated butadiene acrylonitrile copolymer. Average molecular weight of about 2400 | 1200 | B F Goodrich | PA |
| Polamine 2000 | Polytetramethylene oxide-di-p-aminobenzoate of about 2200 molecular weight | 1090 | Air products | PA |
| BiCat 8 | Bismuth/Zinc Neodecanoate | N/A | Shepherd | C |
| Irganox 1076 | Octadecyl 8(3,5-t-butyl-4-hydroxylphenyl) propionate-antioxidant | N/A | Ciba-Geigy | A |
| Dualite M6001AE | Hollow composite polymeric microspheres coated with calcium carbonate of about 50 micron particle size having a density of about 0.13 gm/cc | N/A | Pierce and Stevens | M |
| Expancel 551 DU | Hollow unexpanded microspheres composed of a vinylidene chloride/acrylonitril, copolymer of about 10 microns, containing a blowing agent, Isobutane, that expands to about 35 microns at about 142–150° C. | N/A | Nobel Ind. | MEF |
| Epon 828 | Bisphenol A diglycidylether epoxy resin | 188 | Shell | E |
| Epon 826 | Bisphenol A diglycidylether epoxy resin | 182 | Shell | E |
| D.E.N. 431 | Phenolformaldehyde polyglycidyl ether epoxy resin | 178.5 | Dow | E |
| D.E.R. 736 | Polypropylene oxide diglycidyl ether epoxy resin | 190 | Dow | E |
| Scotchlite™ GB 522/400 | Hollow glass microspheres; density 0.22 g/cc, size 40 μm | N/A | 3M | M |

Production of Isocyanate Reactive Component

Preparation A

A mixture of 800.0 gms Poly-L-385-29, 160.1 gms Epon 826 and 39.9 gms meta-xylene diamine (Epoxide/amine equivalence ratio=1.5), was stirred about three minutes until the mixture was clear. The mixture was then placed in a glass bottle under nitrogen into a 50° C. (122° F.) oven for 48 hours during which the epoxide and epoxide curative reacted to give a dispersion. The solids content was calculated to be 20 percent by adding the weight of the epoxide and the m-xylene diamine divided by the weight of the total mixture. The equivalent weight was calculated to be 2430 based on the hydroxyl number of 28.86 for the Poly-L-385-29 base polyol and 1000 gms of polymer polyol dispersion.

Preparation B

Preparation B was prepared in a like manner, using 800 gms Arcol LHT-28, 160.1 gms Epon 826 and 39.9 gms meta-xylene diamine (Epoxide/amine equivalence ratio= 1.5). The calculated solids content of the dispersion was 20 percent and the calculated equivalent weight was 2504.

Preparation C

Preparation C was prepared in a like manner, using 820 gms castor oil, 144.1 gms Epon 826 and 35.9 gms metaxylene diamine(Epoxide/amine equivalence ratio=1.5). The calculated solids content of the dispersion was 18 percent and the calculated equivalent weight was 419.

Preparation D

Preparation D was prepared in a like manner, using 650 gms of Poly-L-385-29, 269.3 gms Epon™ 826, and 80.7 gms meta-xylenediamine (Epoxide/amine equivalence ratio 1.25). The calculated solids content of the dispersion was 35% and the calculated equivalent weight was 3138.

Preparation E

Preparation E was prepared in a like manner, using 870 gms of castor oil, 95.9 gms Epon™ 826, and 34.5 gm meta-xylenediamine (Epoxide/amine equivalence ratio 1.05). The calculated solids content of the dispersion as 13% and the calculated equivalent weight was 395.

Preparation F

Preparation F was prepared in a like manner, using 800 gms of Poly-G-85-29, 153.9 gms Epon™ 826, and 46.1 gms meta-xylenediamine (Epoxide/amine equivalence ratio 1.25). The calculated solids content of the dispersion was 20% and the calculated equivalent weight was 2526.

Preparation G

Preparation G was prepared in a like manner, using 700 gms of Poly-G-85-29, 230.9 gms Epon™ 826, and 69.1 gms meta-xylenediamine (Epoxide/amine equivalence ratio 1.25). The calculated solids content of the dispersion was 30% and the calculated equivalent weight was 2904.

EXAMPLES

Elastomer Making Procedure

The same general procedure was followed for all of the examples. This procedure requires, first, the preparation of the isocyanate reactive component then adding to it the epoxy resin, additives, fillers and catalyst. Upon addition of isocyanate the reactants were quickly mixed mechanically and poured into a mold. The elastomers were then cured under one of several conditions.

Certain materials were cured overnight at ambient room temperature. This was designated as Cure "A".

To speed the curing, some molds were heated for one and one half hours at 76.7° C. (170° F.), and then allowed to sit overnight. This was designated as cure "B".

Finally, for examples 16 and 17, which involved blocked isocyanates, the molds were placed in a vented oven and heated for forty-five minutes at 124° C. (256° F.). This was designated cure "C".

All microspheres or fillers were dried at least 18 hours at 71.1° C. (160° F.).

Comparative Examples C1–C8

The comparative examples C1–C7 in Table I were prepared to confirm the fact that largely polypropylene ether based elastomers are not kerosene resistant and swell in kerosene, with percent weight gains of greater than 45 percent by weight after immersion of 24 hours at 100° F. Comparative examples C1 and C2 show that this is the case when either aliphatic or aromatic polyisocyanates are used. Comparative example C3 and C4 indicate that the kerosene resistance becomes worse as the isocyanate index was lowered to about 65 as the percent weight gain in kerosene increased. When a polymer polyol dispersion (Multranol™ 9238 or Arcol 34-28 polymer polyol) is incorporated into the polyurethane composition, its use alone is not sufficient to improve the kerosene resistance as shown by comparative examples C5 and C6. The use of 15 percent epoxy resin, Epon™ 826, alone in a polyurethane composition also did not improve the kerosene resistance for comparative example C7.

Example C8 is an elastomer having a composition similar to the examples cited in U.S. Pat. No. 4,789,690; however, the composition was formed into an elastomer rather than foamed with a blowing agent. This Example demonstrates that elastomers following the teachings of U.S. Pat. No. 4,789,690 will exhibit substantial weight gain when immersed in kerosene, and do not show the kerosene resistance of elastomers of the invention.

Further, as can be seen in Table IA, comparative examples similar to examples of the invention, but lacking either the dispersion or the epoxy resin, do not perform as well, particularly with regard to kerosene resistance, as do elastomers of the invention.

TABLE I

| Components | C1 | C2 | C3 | C4 | C5 | C6 | C7 |
|---|---|---|---|---|---|---|---|
| Vestanat IPDI | 5.3 | — | 2.9 | — | — | 5.0 | — |
| Mondur CD | — | 6.5 | — | — | — | — | 5.5 |
| Cyanamid-m-TMXDI | — | — | — | 3.1 | — | — | — |
| Desmodur W | — | — | — | — | 5.9 | — | — |
| Poly-L(R)-385-29 | 92.7 | — | 50.5 | 49.1 | — | — | — |
| Arcol LHT-28 | — | 91.5 | 44.6 | 45.8 | — | — | 77.5 |
| Poly-G-85-28 | — | — | — | — | 44.6 | 45.5 | — |
| Multranol 9238 | — | — | — | — | 47.5 | — | — |
| Arcol 34-28 | — | — | — | — | — | 47.5 | — |
| Epon 826 | — | — | — | — | — | — | 15.0 |
| BiCat 8 | 0.2 | 0.05 | 0.2 | 0.2 | 0.2 | 0.2 | 0.05 |
| Irganox 1076 | 1.8 | 1.95 | 1.8 | 1.8 | 1.8 | 1.8 | 1.95 |
| Isocyanate Index | 99.6 | 99.6 | 65.0 | 65.6 | 97.2 | 96.9 | 99.5 |
| Kerosene Immersion -24 hrs, 38° C. (100° F.) -% Weight Change | +51.4 | +46.1 | +68.0 | +77.0 | +53.2 | +50.5 | +66.5 |

To 80.0 gms Arcol® 11-34, a 4800 MW ethylene oxide tipped polyoxypropylene oxide triol from Arcol Chemical company, a compound similar to polyether triol A in U.S. Pat. No. 4,789,690, 12.26 gms Epon® 826 (A bisphenol-A epoxy resin from Shell Chemical Company similar to Epoxy resin A in the same patent), and 7.74 gms polyoxypropylene oxide diamine (230 MW diamine similar to ethylene diamine in the same patent), were added and placed in a glass containing in an oven at 50° C. for 48 hours. The equivalence ratio of the epoxy resin and diamine was 1.0. The calculated solids content of the dispersion was 20% (similar to polyol dispersion No. 1 in the same patent).

To 50.5 gms Arcol® 11-34, 42.2 gms of the above polyol dispersion and 0.5 gms DAMA 810 (a trialkylamine catalyst from Albermarle Corp. similar to triethylamine catalyst in the same patent) were added and stirred. The 6.8 gms Isonante® 143L (a diisocyanate derivative of 4,4'-diphenyl methane with isocyanate equivalent weight of 143.7 from Dow Chemical Company similar to the diisocyanate mixture used in the same patent) was added and the mixture stirred for two minutes before pouring into a tensile mold to cure. The isocyanate index was 90. Tensile dumbbells were immersed in kerosene for 24 hours at 38° C. The percent weight gain was 44.1%

TABLE 1A

| Components | C1 | Ex. 1 | C6 | Ex. 20 | C5 | Ex. 21 |
|---|---|---|---|---|---|---|
| Vestanat IPDI | 5.3 | 3.4 | 5.0 | 3.5 | — | — |
| Desmodur W | — | — | — | — | 5.9 | 3.6 |
| Poly-L(R)-385-29 | 92.7 | — | — | — | — | — |
| Preparation A - 20% Epoxy resin dispersion in Poly-L(R)-385-29 | — | 74.6 | — | — | — | — |
| Poly-G-85-28 | — | — | 45.5 | — | 44.6 | — |
| Arcol 34-28 | — | — | 47.5 | 28.6 | — | — |
| Multranol 9238 | — | — | — | — | 47.5 | 16.0 |
| Preparation F - 20% Epoxy resin dispersion in Poly-G-85-28 | — | — | — | 43.9 | — | — |
| Preparation G - 30% Epoxy resin dispersion in Poly-G-85-28 | — | — | — | — | — | 56.4 |
| Epon 826 | — | 20.0 | — | 22.0 | — | 22.0 |
| BiCat 8 | 0.2 | 0.2 | 0.2 | 0.2 | 0.2 | 0.2 |
| Irganox 1076 | 1.8 | 1.8 | 1.8 | 1.8 | 1.8 | 1.8 |
| Isocyanate Index | 99.6 | 99.7 | 96.9 | 99.5 | 97.2 | 99.5 |
| Kerosene Immersion -24 hrs, 38° C. (100° F.) % Weight Change | +51.4 | +9.9 | +50.5 | +14.2 | +53.2 | +14.9 |

Examples 1–19

Examples 1–19 were prepared according to the above described procedure. Excellent kerosene resistance was obtained by an unexpected synergism between polypropylene ether polyols containing dispersions and epoxy resins. Examples 1 to 4 of Table II indicate the improvement in kerosene resistance from the incorporation of a polymer polyol, preparation A and/or preparation B, and an epoxy resin, Epon 826. Each of these examples was based on the same polypropylene ether polyols as comparative examples C1 and C2. Thus, in example 1, the dispersion was prepared in a base polyol of Poly-L-385-29 which is the same polypropylene ether polyol used in comparative example C1. With Example 5, the percent weight gain in kerosene was about 0.4% compared to 44.1% for Comparative Example C8.

Examples 1 to 4 offer the results of kerosene percent weight gain as the total weight percent of dispersion polymer plus epoxy resin, present in the elastomer composition, varies from about 23 percent to about 35 percent. The weight percent of the dispersion polymer may be obtained by multiplying the percent solids (dispersion polymer) in the isocyanate reactive component by the weight percent of the polymer polyol present in the total elastomer composition. This value is then added to the weight of the epoxy resin added to the isocyanate reactive component. Thus, for example 1, the isocyanate reactive component "Preparation A" contains a 20% dispersion plus a further 20 weight percent of epoxy resin, i.e. Epon 826, based on the total elastomer composition. The dispersion polymer therefore contribute 0.2×74.6=14.9 percent while the epoxy resin contributes 20 percent of the total weight percent of the elastomer composition. Combined, these two components contribute 34.9 weight percent of the elastomer composition.

Note that Examples 1–4 also retain excellent low temperature properties, with glass transition temperatures ($T_g$) of below −65° F. (−54° C.) from the TMA scans. In addition, the percent weight gain in boiling water after 1 week was below 4 percent for all these examples, thus reflecting the excellent hydrolyric stability. An inert polyester plasticizer, Plasthall® P643, was included in Example 6 of Table II along with a polycarbonate polyol (Permapol® KM 10-1733). Example 7 of Table III demonstrates the use of an aliphatic epoxy resin, i.e., D.E.R. 736, instead of the aromatic Epon® 826 epoxy resin.

Surprisingly, examples 8 to 15 and 18–19 of Tables III and IV demonstrate that useful kerosene resistant viscoelastic elastomers can be obtained even at extremely low isocyanate indices, e.g., even to 10 to below. Tables II to V also show elastomers made from varying systems to demonstrate the broad nature of the invention. Example 8 has an isocyanate index below 10 yet still shows excellent kerosene resistance. The examples also demonstrate the range of polyisocyanates useful in systems of the invention. Aliphatic polyisocyanates are used in Examples 1 to 8 and 11 to 14. Examples 9, 10 and 15 use aromatic polyisocyanates, and blocked isocyanates are used in 16 and 17. Various amines are utilized; an aliphatic triamine in example 11, an aromatic diamine in Example 12, a secondary aliphatic diamine in Example 13, and a polydimethylsiloxane diamine in Example 14. A Novolak type epoxy resin was used in Examples 12, 13 and 15. Likewise, polymer polyols have been varied throughout the examples. Elasticity remained for the compositions with low isocyanate indices even after dry heat aging of the elastomers at about 104° C., and no syneresis occurred under those conditions.

Light weight elastomers were prepared containing hollow microspheres as demonstrated in examples 8, 10 to 14, 16 and 19.

Unexpanded hollow polymeric microspheres (Expancel 551DU in Exp. 16) were also expanded during a heat cure with blocked isocyanates, to give an expanding sealant as described earlier. Example 16 expanded about 100 percent.

Example 19 demonstrates a very soft sealant suitable for a connector sealant.

TABLE II

| Components | 1 | 2 | 3 | 4 | 5 | 6 |
|---|---|---|---|---|---|---|
| Vestanat IPDI | 3.4 | 4.0 | 3.8 | 2.8 | 4.6 | — |
| Desmodur W | — | — | — | — | — | 6.5 |
| Preparation A - 20% Epoxy resin dispersion in Poly-L-385-29 | 74.6 | 31.0 | 84.2 | 61.2 | — | — |
| Preparation B - 20% Epoxy resin dispersion in Arcol LHT-28 | — | — | — | 29.0 | — | — |
| Multranol 9151 | — | 48.0 | — | — | 62.2 | 51.5 |
| Urethhall 4150-55 | — | — | — | — | 11.2 | — |
| Plasthall P643 | — | — | — | — | — | 10.0 |
| Permapol KM 10-1733 | — | — | — | — | — | 10.0 |
| BiCAT 8 | 0.2 | 0.2 | 0.2 | 0.2 | 0.1 | 0.2 |
| Irganox 1076 | 1.8 | 1.8 | 1.8 | 1.8 | 1.9 | 1.8 |
| Epon 826 | 20.0 | 15.0 | 10.0 | 5.0 | 20.0 | 20.0 |
| Cure | B | B | B | B | A | A |
| Isocyanate Index | 99.7 | 98.0 | 98.7 | 68.5 | 98.5 | 100 |
| Kerosene Immerson -24 hrs, 38° C. (100° F.) -% Weight Change | +9.9 | +14.8 | +18.8 | +30.0 | +0.4 | +9.0 |
| $T_g$(from TMA) °C. (°F.) | −54.0 (−65.0) | −54.1 (−65.4) | −56.5 (−69.8) | −53.6 (−64.4) | −54.0 (−65.2) | 45.7 (−50.3) |
| Hardness, Shore 00 | 71.1 | 79.6 | 75.8 | 54.2 | 74.0 | 48.8 |
| Hardness, 1/4 Cone | 5.0 | 2.0 | 3.4 | 10.2 | 5.0 | 11.6 |
| Density, gm/cc | — | — | — | — | — | — |
| Tensile Strength, N/cm² (psi) | 92.9 (132.2) | 129.9 (184.8) | 80.9 (115.1) | 46.8 (66.6) | 103.9 (147.8) | 142.8 (203.1) |
| % Elongation, Initial | 231.8 | 142.1 | 134.2 | 284.4 | 222.9 | 579.7 |

TABLE II-continued

| Components | 1 | 2 | 3 | 4 | 5 | 6 |
|---|---|---|---|---|---|---|
| Tear Strength, N/cm | 51.5 | 63.6 | 45.9 | 38.2 | 49.0 | 41.3 |
| (lb/in) | (29.4) | (36.3) | (26.2) | (21.8) | (28.0) | (23.6) |
| After dry heat aging -18 hrs, 104.4° C., % Elongation | 254.9 | 144.6 | 137.7 | 349.7 | 278.3 | 634.6 |
| Syneresis | None | None | None | None | None | None |
| Hydrolytic Stability - 7 days, 100° C., % Weight Change | +1.1 | +3.9 | +3.7 | +3.4 | +3.6 | −1.4 |

TABLE III

| Components | 7 | 8 | 9 | 10 | 11 |
|---|---|---|---|---|---|
| Vestanat IPDI | 4.9 | 1.7 | — | — | 2.8 |
| Mondur CD | — | — | 4.1 | 2.9 | — |
| Multranol 9151 | 61.4 | 30.6 | 57.5 | 40.6 | 43.1 |
| Urethhall 4050-35 | 10.0 | — | — | — | — |
| Capa 316 | 1.7 | — | — | — | — |
| Preparation C - 18% Epoxy resin dispersion in Castor Oil | — | 59.7 | — | — | — |
| Castor Oil | — | — | 16.4 | 28.5 | 26.2 |
| Jeffamine T5000 | — | — | — | — | 6.4 |
| D.E.R. 736 | 20.0 | — | — | — | — |
| Epon 826 | — | — | 20.0 | 20.0 | — |
| Epon 828 | — | — | — | — | 13.5 |
| BiCAT 8 | 0.1 | 0.4 | 0.05 | 0.1 | 0.4 |
| Irganox 1076 | 1.9 | 1.6 | 1.95 | 1.9 | 1.6 |
| Dualite M6001AE | — | 6.0 | — | 6.0 | 6.0 |
| Cure | B | B | B | B | A |
| Isocyanate Index | 100 | 9.7 | 37.6 | 19.7 | 23.9 |
| Kerosene Immerson -24 hrs, 38° C. (100° F.) -% Weight Change | +11.7 | +3.8 | +4.3 | +0.6 | +12.6 |
| $T_g$(from TMA) °C. (°F.) | −61.0 (−77.8) | −55.9 (−68.6) | −48.7 (−55.7) | −55.8 (−68.4) | −54.3 (−65.7) |
| Hardness, Shore 00 | 53.0 | 25.0 | 62.9 | 45.0 | 41.0 |
| Hardness, 1/4 Cone | 13.0 | 20.6 | 5.8 | 16.7 | 3.0 |
| Density, gm/cc | — | 0.607 | — | 0.553 | — |
| Tensile Strength, N/cm² | 112.8 | 19.3 | 94.3 | 25.5 | 34.5 |
| (lb/in) | (160.4) | (27.5) | (134.2) | (36.3) | (49.1) |
| % Elongation, Initial | 351.8 | 290.3 | 258.5 | 346.0 | 272.4 |
| Tear Strength, N/cm | 50.1 | 14.4 | 38.5 | 18.6 | 28.7 |
| (lb/in) | (28.6) | (8.2) | (22.0) | (10.6) | (16.4) |
| After dry heat aging -18 hrs, 104.4° C., % Elongation | 346.2 | 272.4 | 262.5 | 491.8 | 359.2 |
| Syneresis | None | None | None | None | None |
| Hydrolytic Stability -7 days, 100° C., % Weight Change | +1.9 | — | +2.5 | +4.6 | +8.0 |

TABLE IV

| Components | 12 | 13 | 14 | 15 |
|---|---|---|---|---|
| Cyanamid n-TMXDI | 4.0 | 3.7 | — | — |
| Desmodur W | — | — | 3.6 | — |
| Mondur CD | — | — | — | 3.0 |
| Multranol 9151 | 59.0 | 54.5 | 53.2 | 42.1 |
| Castor Oil | 5.4 | 10.1 | — | — |
| Preparation C - 18% Epoxy Resin Dispersion in Castor Oil | — | — | 9.4 | — |
| Polyamine 2000 | 3.6 | — | — | — |
| Hycar 1300 x 21 | — | 3.7 | — | — |
| PDMS diamine | — | 6.8 | — | — |
| Epon 826 | — | — | 19.0 | — |
| D.E.N. 431 | 20.0 | 20.0 | — | 20.0 |
| Pluracol 994LV | — | — | — | 32.9 |
| BiCAT 8 | 0.2 | 0.2 | 0.2 | 0.02 |
| Irganox 1076 | 1.8 | 1.8 | 1.8 | 1.98 |
| Dualite M6001AE | 6.0 | 6.0 | 6.0 | — |
| Cure | B | A | B | B |
| Isocyanate Index | 63.3 | 50.8 | 54.9 | 55.2 |
| Kerosene Immerson -24 hrs, 38° C. (100° F.) -% Weight Change | +11.2 | +12.9 | +13.9 | +13.2 |
| $T_g$(from TMA) °C. (°F.) | −64.3 (−83.7) | −60.0 (−76.0) | −49.2 (−56.5) | −55.6 (−68.0) |
| Hardness, Shore 00 | 60.4 | 64.4 | 74.6 | 65.0 |
| Hardness, 1/4 Cone | 4.5 | 3.0 | 4.8 | 9.0 |

TABLE IV-continued

| Components | 12 | 13 | 14 | 15 |
|---|---|---|---|---|
| Density, gm/cc | 0.58 | 0.58 | 0.697 | — |
| Tensile Strength, N/cm² (psi) | 72.6 (103.3) | 79.5 (113.1) | 70.9 (100.9) | 101.7 (144.7) |
| % Elongation, Initial | 343.3 | 251.9 | 193.6 | 408.9 |
| Tear Strength, N/cm (lb/in) | 46.1 (26.3) | 36.4 (20.8) | 54.5 (31.1) | 59.5 (34.0) |
| After dry heat aging -18 hrs, 104.4° C., | | | | |
| % Elongation | 264.0 | 186.4 | 176.5 | 389.6 |
| Syneresis | None | None | None | None |
| Hydrolytic Stability -7 days, 100° C., | | | | |
| % Weight Change | — | +15.0 | +4.8 | +4.1 |

TABLE V

| Components | 16 | 17 | 18 | 19 |
|---|---|---|---|---|
| Desmocap 11A | 35.6 | 48.4 | — | — |
| Vestanat IPDI | — | — | 2.2 | 1.67 |
| Arcol 34-28 | — | 27.7 | — | — |
| Preparation A - 20% Epoxy resin dispersion in Poly L-385-29 | 49.4 | — | — | — |
| Jeffamine T403 | — | 1.9 | — | — |
| Preparation D - 35% Epoxy resin dispersion in Poly L-385-29 | — | — | 62.1 | — |
| Castor Oil | — | — | 18.7 | — |
| Poly-L-385-29 | — | — | — | 30.67 |
| Preparation E - 13% Epoxy resin dispersion in Castor Oil | — | — | — | 56.66 |
| Epon 826 | 10.0 | 20.0 | 15.0 | — |
| BiCat 8 | 0.5 | 0.5 | 0.5 | 0.5 |
| Irganox 1076 | 1.5 | 1.5 | 1.5 | 1.5 |
| Expancel 551DU | 3.0 | — | — | — |
| 3M Scotchlite GB S22 | — | — | — | 9.0 |
| Cure | C | C | B | B |
| Isocyanate Index | 100 | 65.7 | 26.7 | 9.5 |
| Kerosene Immerson -24 hrs, 38° C. (100° F.) -% Weight Change | — | +14.0 | +9.7 | +11.3 |
| T$_g$(from TMA) °C. (°F.) | — | −47.0 (−52.8) | −47.5 (−53.5) | −54.2 (−65.5) |
| Hardness, Shore 00 | 40.2 | 67.0 | 58.0 | — |
| Hardness, 1/4 Cone | 11.2 | 7.0 | 10.8 | 32.6 |
| Density, gm/cc | — | — | — | 0.664 |
| Tensile Strength, N/cm² (psi) | 38.0 (54.0) | 71.3 (101.4) | 5.6 (14.0) | 638 |
| % Elongation, Initial | — | 186.0 | 295.1 | 6.7 (3.85) |
| Tear Strength, N/cm (lb/in) | — | 21.0 (12.0) | — | |
| After dry heat aging -18 hrs, 104.4° C., | | | | |
| % Elongation | — | 178.7 | 570.6 | — |
| Syneresis | | None | None | — |
| Hydrolytic Stability -7 days, 100° C., % Weight Change | — | +4.2 | — | — |

Damping behavior as delineated by Tan delta was determined from a dynamic mechanical analysis performed on a Rheometrics RDA-II (Rheometrics, Inc., Picataway, N.J.) at a 2 c/min. heating rate, nitrogen atmosphere, 7.9 min. disp. parallel plates at a test frequency of 1 Hz with an initial strain=0.05%/Autostrain. The temperature interval at Tan delta≧0.6, the peak maximum of Tan delta and the temperature at which Tan delta is a maximum are shown in Table VI.

TABLE VI

| Example | Tan delta amplitude (maximum) | Temp. Interval at Tan delta ≧ 0.6 (°C.) |
|---|---|---|
| 8 | 1.21 | −18 to −67 (maximum at −51.7) |
| 19 | 2.07 | +15 to −68 (maximum at −54.1) |

What is claimed is:

1. An elastomer composition, resistant to hydrocarbon fluid and water absorption, comprising
    a) an isocyanate reactive component comprising a polypropylene ether polyol containing from about 5 to about 60 percent by weight dispersed polymer particles comprising a condensation or addition polymer,
    b) from about 5 to about 35 percent by weight of a liquid epoxy polymer containing more than one α-epoxy group, and
    c) a polyurethane formed from said polypropylene ether polyol, having active hydrogen atoms and at least one isocyanate component in the presence of said dispersed polymer particles and said liquid epoxy polymer,
said polyurethane having an isocyanate index of less than 100, said elastomer exhibiting less than about 20 percent weight gain after being immersed in kerosene for 24 hours at 38° C., said elastomer exhibiting substantially no syneresis after 18 hours in a 104° C. oven.

2. An elastomer composition according to claim 1 comprising,
    a) an isocyanate reactive component comprising a polypropylene ether polyol containing from about 5 to about 60 percent by weight dispersed polymer particles containing from about 15 to about 35 percent by weight of at least one material selected from epoxides and polyureas,
    b) a liquid epoxy polymer containing more than one α-epoxy group, and
    c) a polyurethane formed from said polypropylene ether polyol, having active hydrogen groups, and at least one isocyanate component in the presence of said dispersed polymer particles and said epoxy resin,
said polyurethane having an isocyanate index of less than 100.

3. An elastomer composition according to claim 1 wherein said elastomer exhibits a weight gain of less than about 10%.

4. An elastomer composition according to claim 1 comprising:
    a) at least about 20 percent by weight of an isocyanate reactive component comprising at least one polypropylene ether polyol containing 15 to about 40 percent dispersed polymer particles selected from the group consisting of epoxides and polyureas,
    b) from about 5 to about 35 percent by weight of at least one liquid epoxy polymer containing more than one α-epoxy group, and
    c) from about 1 to about 50 percent by weight of at least one polyurethane, said elastomer exhibiting less than about 10 percent weight gain after being immersed in kerosene for 24 hours at 38° C.

5. An elastomer composition according to claim 1 wherein the total weight percent of said dispersed polymer particles and said epoxy compound is from about 30 to about 35 percent, based on the total elastomer formulation.

6. An elastomer composition according to claim 4 wherein said epoxy comprises from about 5 to about 30 percent by weight, based on the total elastomer formulation.

7. An elastomer composition according to claim 1 wherein said epoxy has an epoxide equivalent weight of from about 90 to about 250.

8. An elastomer composition according to claim 1 wherein said epoxy is selected from the group consisting of reaction products of:

a) polyphenols and epihalohydrins, b) polyalcohols and epihalohydrins, c) polycarboxylic acids and epihalohydrins, d) amines and epihalohydrins, e) polyisocyanates and 2,3-epoxy-1-propanol, and f) mixtures of the above.

9. An elastomer composition according to claim 8 wherein said epoxy is selected from the group consisting of glycidyl ethers of bisphenol A compounds, brominated bisphenol A resins, phenolic resins, and mixtures thereof.

10. An elastomer composition according to claim 1 wherein said polyisocyanate has the formula $Q(NCO)_n$, wherein n is an integer from about 2 to about 4, and Q is selected from the group consisting of an aliphatic hydrocarbon radical containing from about 2 to about 100 carbon atoms, and up to 50 heteroatoms; a cycloaliphatic hydrocarbon radical containing from 4 to 100 carbon atoms and zero to 50 heteroatoms; an aromatic hydrocarbon radical or heterocyclic aromatic radical containing from 6 to 15 carbon atoms and zero to 10 heteroatoms, and an araliphatic hydrocarbon radical containing from 8 to 100 carbon atoms and zero to 50 heteroatoms.

11. An elastomer composition according to claim 10 wherein said polyisocyanates are selected from the group consisting of 1-isocyanato-3,3,5-trimethyl-5-isocyanatomethyl cyclohexane (isophorone diisocyanate), dimer acid diisocyanate, 2,4'diphenyl methane diisocyanate and carbodiimide derivatives thereof, 4,4'diphenyl methane diisocyanate and carbodiimide derivatives thereof, 2,4'-tolylene diisocyanate, 2,6'-tolylene diisocyanate, and 4,4'-methylene-bis(cyclohexyl diisocyanate).

12. An elastomer composition according to claim 1 wherein said polypropylene ether polyol contains at least about 65% oxypropylene units derived from propylene oxide.

13. An elastomer composition according to claim 12 wherein said polypropylene ether polyol has a total unsaturation content of less than about 0.08.

14. An elastomer composition according to claim 1 further comprising an additional polyol selected from the group consisting of polyether polyols based on ethylene oxide, propylene oxide, butylene oxide, tetrahydrofuran, epichlorohydrin or mixtures thereof, ricinoleic acid derivatives, polyester polyols, polyamide or polyesteramide polyols; tertiary amine containing polyols, propoxylated amides or amines; polyalkadiene polyols derived from butadiene polymers or copolymers, and hydrogenated derivatives thereof; polyacetals, polycarbonates containing hydroxyl groups; polyhydroxyl (meth)acrylic resins, polythioether polyols, polyhydroxyl compounds already containing urethane or urea groups, and polymer polyols.

15. An elastomer composition according to claim 1 further comprising a polyamine selected from the group consisting of aminopolyethers, polyamidoamines, polyoxyalkylene polyamines, amine-terminated butadiene/acrylonitrile copolymers, aminoalkyl terminated polydiorganosiloxanes, polytetramethytene oxide-di-aminobenzoates, polyethers containing aromatic amine end groups and amine-terminated polyethers containing a moiety selected from urea, amide, ester and urethane moieties in the polymer backbone.

16. An elastomer composition according to claim 1 comprising at least one plasticizer selected from the group consisting of polyalphaolefins, cyclic polyolefins, petroleum oils, vegetable oils, naphthenic oils, paraffinic oils, synthetic oils, phosphate esters, monoesters, diesters, polyesters, rosin esters, pine oil, coal tar, glyceryl-tri(acetylricinoleate) and mixtures thereof.

17. An elastomer composition according to claim 1 further comprising an effective amount of a catalyst for the reaction of said polyisocyanate component and said isocyanate reactive component.

18. An elastomer composition according to claim 17 wherein said catalyst is an organobismuth compound.

19. An elastomer composition according to claim 1 wherein said reaction product has an isocyanate index of less than about 80.

20. An elastomer composition according to claim 19 wherein said reaction product has an isocyanate index of less than about 65.

21. An elastomer composition according to claim 1 further comprising from about 10 to about 60 volume percent hollow microspheres.

22. An elastomer composition according to claim 21 wherein said microspheres are selected from the group consisting of glass microspheres, expanded and unexpanded polymeric microspheres, and ceramic microspheres.

23. A sealant for a signal conducting device comprising an elastomer composition according to claim 1.

24. A signal transmission component comprising a) an outer closure member capable of enclosing a cable splice, said cable splice having at least one set of wires penetrating said splice, and b) a means for sealing said outer closure comprising an endseal composed of an elastomer composition according to claim 1, said endseal being positioned between said outer closure and said at least one set of wires, said endseal having means formed therein for passage of said wires.

25. A signal transmission component according to claim 24 wherein said device comprises an electrical or optical cable.

26. A signal transmission component wherein said device comprises a) an outer closure capable of enclosing a cable splice and b) a resealable sealing means composed of an elastomer composition according to claim 1, and c) a means for compression, said sealing means being maintained under compression.

27. A sealing gasket suitable for sealing a space between two surfaces comprising elastomer composition according to claim 1.

28. A sealing gasket according to claim 27 wherein said space is useful for containing fuel.

29. An electrical transmission device comprising an electrically transmissive component and an elastomer composition according to claim 1.

* * * * *